US006944433B2

(12) United States Patent
Ogino

(10) Patent No.: US 6,944,433 B2
(45) Date of Patent: Sep. 13, 2005

(54) PORTABLE TELEPHONE APPARATUS THAT CAN ATTAIN DIRECTIVITY OF ANTENNA WHICH OPTIMIZES RECEPTION STATE FROM BASE STATION

(75) Inventor: Tooru Ogino, Tokyo (JP)

(73) Assignee: NEC Corporation (JP)

( * ) Notice: Subject to any disclaimer, the term of this patent is extended or adjusted under 35 U.S.C. 154(b) by 619 days.

(21) Appl. No.: 09/828,411

(22) Filed: Apr. 6, 2001

(65) Prior Publication Data

US 2001/0029173 A1 Oct. 11, 2001

(30) Foreign Application Priority Data

Apr. 7, 2000 (JP) ....................................... 2000-106897

(51) Int. Cl.7 .................................................. H04B 1/06
(52) U.S. Cl. ............................... 455/277.1; 455/575.7; 343/702
(58) Field of Search .............................. 455/272, 277.1, 455/277.2, 279.1, 575.1, 575.3, 575.7; 343/702

(56) References Cited

U.S. PATENT DOCUMENTS

| | | | | |
|---|---|---|---|---|
| 5,451,965 | A | 9/1995 | Matsumoto | 343/702 |
| 6,211,830 | B1 | 4/2001 | Monma et al. | 342/702 |

FOREIGN PATENT DOCUMENTS

| | | | |
|---|---|---|---|
| EP | 0 661 825 A1 | 12/1994 | H04B/1/38 |
| GB | 2 351 848 A | 1/2001 | H01Q/1/24 |
| JP | 55-056703 | 4/1980 | H01Q/3/44 |
| JP | 56-010708 | 2/1981 | H01Q/3/24 |
| JP | 06-097713 | 4/1994 | H01Q/1/24 |
| JP | 9-93322 | 4/1997 | H04M/1/02 |
| JP | 10-154955 | 6/1998 | H04B/7/26 |
| JP | 2000-13276 | 1/2000 | H04B/1/40 |
| JP | 2000-22609 | 1/2000 | H04B/7/04 |
| JP | 2000-59256 | 2/2000 | H04B/1/38 |
| WO | WO99/65108 | 12/1999 | H01Q/3/44 |

*Primary Examiner*—Lee Nguyen
(74) *Attorney, Agent, or Firm*—Hayes Soloway P.C.

(57) ABSTRACT

A portable telephone apparatus, includes a body and an antenna section. The antenna section includes an antenna element, and a plurality of reflectors provided near the antenna element. The antenna section is provided at a end side where a microphone is provided of the body.

19 Claims, 8 Drawing Sheets

PORTABLE TELEPHONE APPARATUS THAT CAN ATTAIN DIRECTIVITY OF ANTENNA WHICH OPTIMIZES RECEPTION STATE FROM BASE STATION

BACKGROUND OF THE INVENTION

1. Field of the Invention

The present invention relates to a portable telephone apparatus. More particularly, the present invention relates to a portable telephone apparatus having an antenna diversity effect.

2. Description of the Related Art

Conventionally, an antenna of a portable telephone apparatus is disposed on an upper side of the portable telephone apparatus located on a side on which a receiver is disposed.

FIG. 1 is a view showing an arrangement configuration of an antenna of a conventional foldable portable telephone apparatus. This employs the configuration having: a lower body 81 with a microphone and a keyboard; an upper body 82 with a display and a receiver, which is coupled through a hinge to the body 81 in a foldable manner; and an antenna 83 disposed on an upper side of the upper body.

W-CDMA (wideband CDMA) that is the as a next generation of a portable telephone system employs a receiving system different from a current system of a PDC system, in which a continuous reception and a continuous transmission are carried out together with a transmission operation and a reception operation.

The conventional portable telephone apparatus employs an upper antenna arrangement in which an antenna is disposed on a receiver side. So, in a call condition that the portable telephone apparatus is used in contact with an ear, the upper antenna approaches a head of a human body. Thus, this results in a problem of a deterioration in a property of the antenna.

When the W-CDMA portable telephone system uses the antenna diversity method, a base station can employ a RAKE reception manner of synthesizing the arriving arrival waves with temporal differences from each other, increasing a reception power and improving a sensibility. At this time, it is possible to take a measure, such as a measure that when one reception state is poor, the other antenna is used to receive.

However, the transmission operation and the reception operation as well as the continuous reception and the continuous transmission are carried out. So, the employment of the antenna diversity method for switching between the two antennas results in the problem that a reception data becomes erroneous the moment of the switching between the antennas, and a normal reception and a normal transmission can not be done.

As the measure against such problems, a method may be considered for employing a manner in which an antenna is disposed on a lower portion implying a mount side of a transmitter in the portable telephone apparatus. Also in this case, the W-CDMA communication system can not carry out the antenna diversity.

Japanese Laid Open Patent Application (JP-A-Heisei, 9-93322) discloses the following portable telephone apparatus. This portable telephone apparatus is characterized in that respective micro strip antennas for reception and transmission are disposed on the substantially same planes in a predetermined interval and have resonance frequencies different from each other although they are positioned close to each other.

Japanese Laid Open Patent Application (JP-A-Heisei, 10-154955) discloses the following portable telephone apparatus. This portable telephone apparatus has a plurality of antennas, switches and selects an antenna having an allowable reception level, and carries out a reception. This portable telephone apparatus is provided with: a switching operation detector for detecting the switching operation of the antenna; and a high speed shift state judge device for judging that the portable telephone apparatus is at a high speed shift state if a frequency of the switching operations detected by the switching operation detector exceeds a predetermined value.

Japanese Laid Open Patent Application (JP-A, 2000-13276) discloses the following radio communication device. This radio communication device is provided with a transmission/reception whip antenna, a reception diversity antenna, a transmission circuit, a reception circuit, and an antenna switch disposed between the transmission/reception whip antenna, the reception diversity antenna, the transmission circuit and the reception circuit. This radio communication device is characterized in that a load matching circuit is mounted between a final stage power amplifier of the transmission circuit and the antenna switch.

Japanese Laid Open Patent Application (JP-A, 2000-22609) discloses the following portable radio communication device. In this portable radio communication device, a transmission/reception circuit having a transmission circuit and a reception circuit, a plurality of flat antennas having a substantially single directivity, a power synthesizer and a power distributor are accommodated within a body in a form of substantially rectangular parallelepiped. Each of the plurality of flat antennas is disposed on a different surface within the body. A transmission signal outputted by the transmission circuit is sent through the power distributor to each of the plurality of flat antennas. A reception signal received by the plurality of flat antennas is sent through the power synthesizer to the reception circuit.

Japanese Laid Open Patent Application (JP-A, 2000-59256) discloses the following fixed antenna device. This fixed antenna device has the following feature. That is, in an antenna used in a portable telephone apparatus, a movable electromagnetic shield plate opposite to a tapered antenna element is disposed at a position of a front direction of a body, parallel to the tapered antenna element fixed on an upper portion of the body. Then, the shield state of an electromagnetic wave to the front direction of the body from the tapered antenna element is varied by moving the movable electromagnetic shield plate upward and downward.

SUMMARY OF THE INVENTION

The present invention is accomplished in view of the above mentioned problems. Therefore, an object of the present invention is to provide a portable telephone apparatus that can attain a directivity of an antenna for optimizing a reception state from a base station. Another object of the present invention is to provide a portable telephone apparatus having an antenna diversity function in which influence on a human body is small.

In order to achieve an aspect of the present invention, a portable telephone apparatus, includes: a body; and an antenna section, and wherein the antenna section includes an antenna element, and a plurality of reflectors provided near the antenna element, and wherein the antenna section is provided at a end side where a microphone is provided of the body.

In this case, the antenna section is provided in the body.

Also in this case, the number of the plurality of reflectors is two.

Further in this case, each of the plurality of reflectors is a conductive plate.

In this case, an end portion of each of the plurality of reflectors is in parallel with a direction of a length of the antenna element.

Also in this case, planes of the plurality of reflectors are oriented to directions different from each other.

Further in this case, one of the plurality of reflectors is connected to a ground, selectively to change a directivity of the antenna element.

In this case, the directivity of the antenna element is changed without using a mechanic structure to reflect radio waves emitted from the antenna element of the plurality of reflectors.

Also in this case, the portable telephone apparatus further includes: a judging unit judging a state of a signal received at the antenna section to produce a control signal, and wherein one of the plurality of reflectors is connected to a ground, selectively to change a directivity of the antenna element, based on the control signal.

Further in this case, after the one of the plurality of reflectors is connected to the ground, selectively to change the directivity of the antenna element, based on the control signal, the another of the plurality of reflectors is connected to the ground, selectively to change the directivity of the antenna element, based on the control signal.

In this case, the judging unit detects an RSSI, an Eb/Io, and a BER of the received signal to produce the control signal.

Also in this case, the antenna section is covered by a mold not to be viewed.

Further in this case, the portable telephone apparatus further includes: a switching unit to switch between one and another of the plurality of reflectors, and wherein each of the plurality of reflectors is connected to the ground through a capacitor.

In this case, a coil is provided between the each reflector and the capacitor to be connected with the ground.

Also in this case, the portable telephone apparatus is a type of W-CDMA system.

Further in this case, the portable telephone apparatus performs a continuous transmission and a continuous reception.

In this case, the plurality of reflectors is provided under a board on which a radio unit is mounted.

Also in this case, each of the plurality of reflectors has a triangular shape.

Further in this case, each of the plurality of reflectors has a curved surface corresponding to a curved surface of an end portion of the body.

In this case, one of the plurality of reflectors is connected to the ground, selectively to change the directivity of the antenna element at established periods.

Actually, an antenna of a portable telephone apparatus of the present invention is disposed on a lower portion of a body (for example, FIG. 3). When the structure of the lower portion of the antenna is viewed from the upper side, the antenna (22 of FIG. 3) is located on the lower portion of the body. Reflectors (23, 24 of FIG. 3) in which a contact/non-contact is controlled on the basis of an impedance to GND are disposed on both sides. Its upper portion is covered by the body or a cover (25 of FIG. 3). A printed circuit board (31 of FIG. 4) on which a radio circuit and the like are mounted, and the antenna 22 approach or come in contact with each other. The reflector located on the lower portion of the antenna is connected through a capacitor and a coil to vary a ground impedance to the GND of the printed circuit board.

The antenna reflectors are connected to the GND by a switching relay (616 of FIG. 7) through capacitors and coils (for example, 620, 618, 619 and 617 of FIG. 7) to vary the impedance, in accordance with a signal from a switching judge circuit (614 of FIG. 7). The switching operation between the antenna reflectors changes a directivity of a lower antenna of the portable telephone apparatus. This directivity depends on the change in the directivities of right and left antennas since the impedance of the GND in the lower portion of the antenna is changed, and it does not depend on the fact that an electric wave is reflected by the mechanic structure of the antenna reflector.

This can select and receive an optimal arrival wave from a base station, by using a deviation of a directivity and changing a directivity of an antenna without switching an antenna even in a case of a continuous transmission and a continuous reception such as the W-CDMA system, and can accordingly attain a high reception sensibility.

DESCRIPTION OF THE PREFERRED EMBODIMENTS

An embodiment of an appearance inspection method according to the present invention will be described below with reference to the attached drawings.

(Explanation of Configuration)

Figure 1:
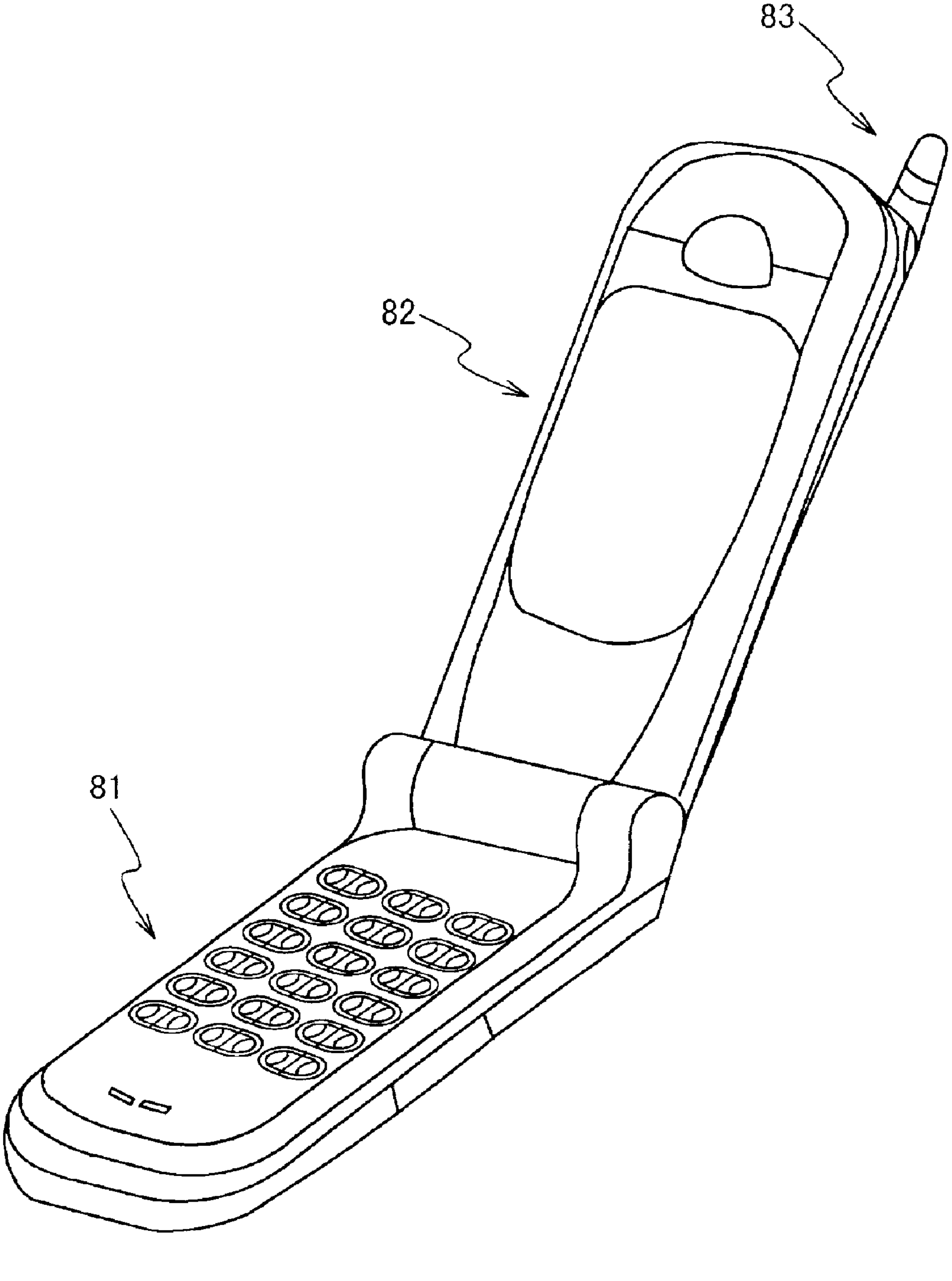
Fig. 1 PRIOR ART
FIG. 1 is a view showing an appearance of a conventional portable telephone apparatus.
Figure 2:
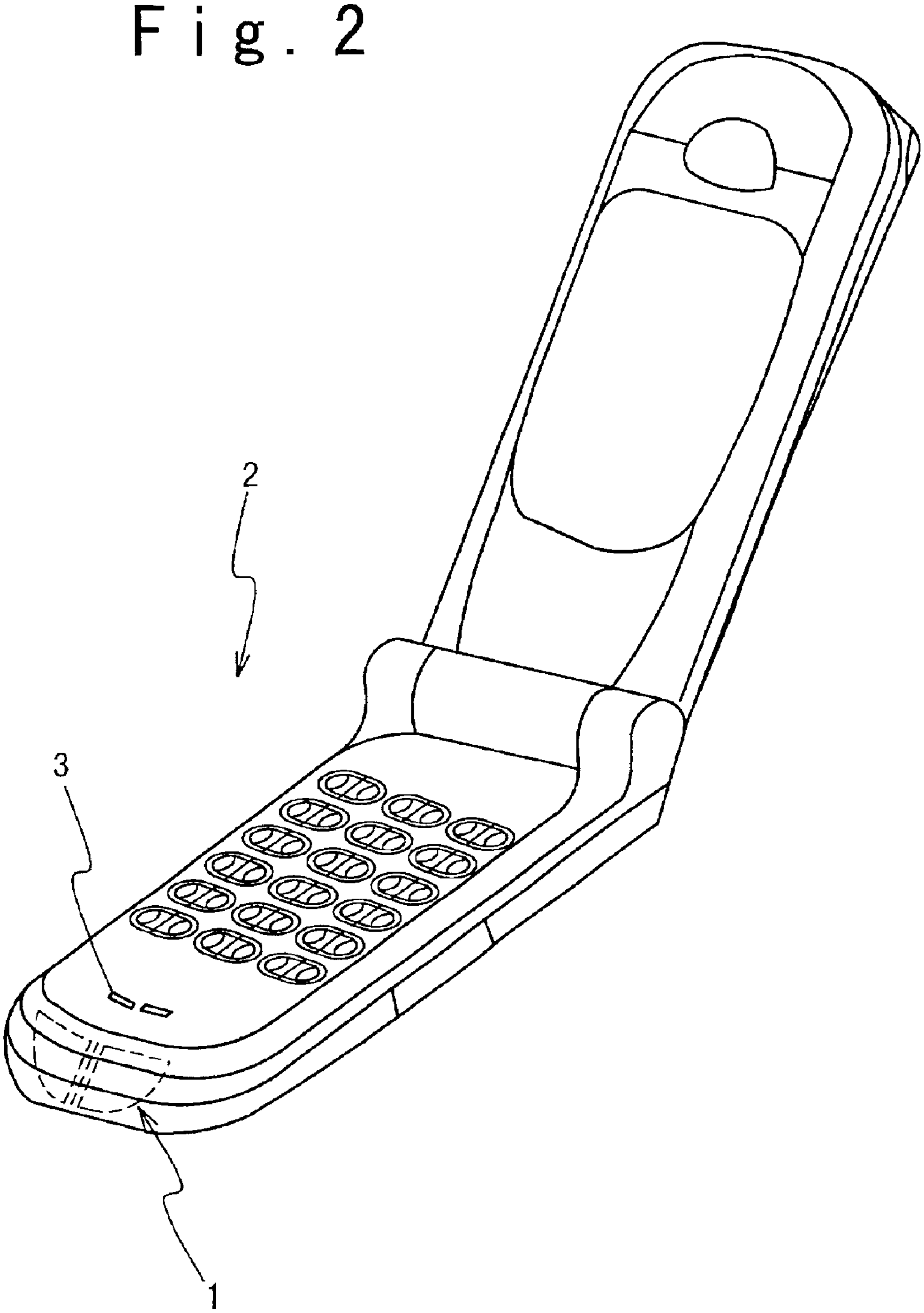
FIG. 2 is a view showing an appearance of a portable telephone apparatus according to an embodiment of the present invention.

FIG. 2 is a view showing an appearance of an embodiment of a portable telephone apparatus according to the present invention. An antenna 1 of the portable telephone apparatus in this embodiment is disposed so as to be located on a lower portion that is on a side (a transmitter side) on which a transmitter 3 of a portable telephone apparatus 2 is disposed. This configuration reduces the influence on a head of a human body and the like under a condition that a user holds the portable telephone apparatus at a time of a call since the antenna is located on the lower side, as compared with the whip type antenna 83 of the conventional portable telephone apparatus shown in FIG. 2.

Figure 3:
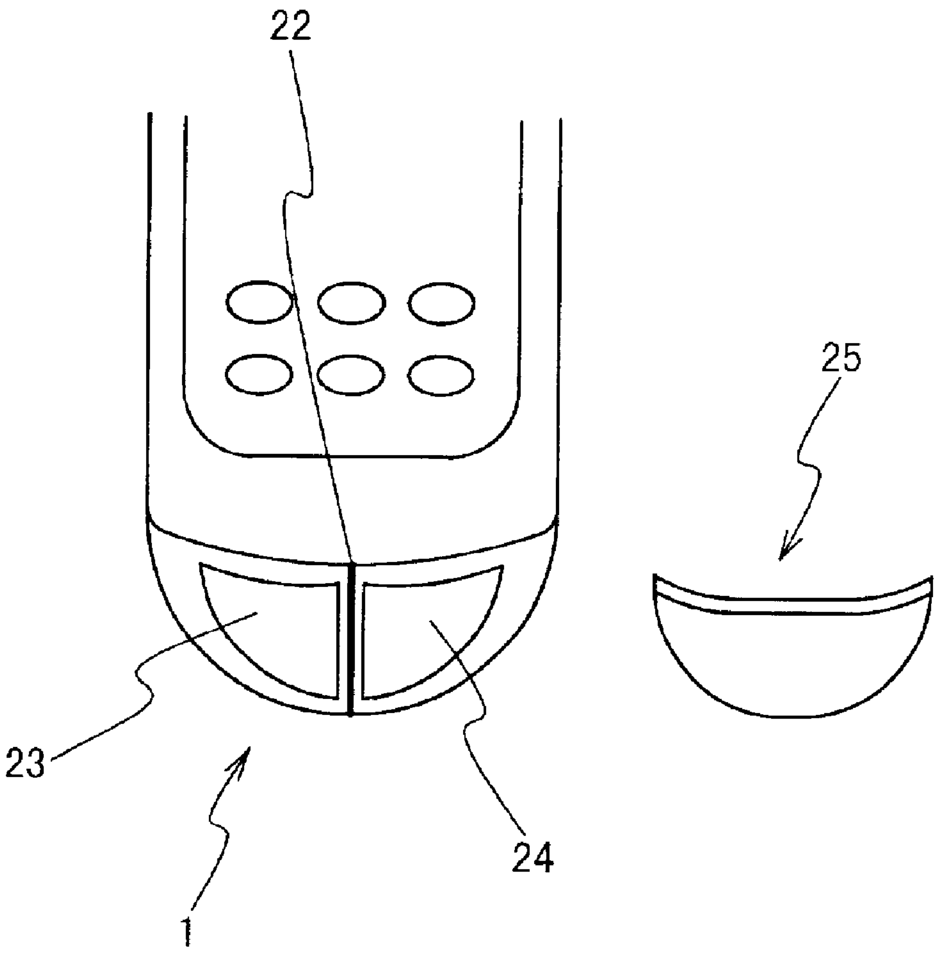
FIG. 3 is an enlarged view showing a configuration of a lower portion of the portable telephone apparatus according to this embodiment.

FIG. 3 is an enlarged view showing the lower portion of the portable telephone apparatus. The lower antenna 1 in this embodiment is provided with an antenna element 22, and antenna reflectors 23, 24 located on the right and left sides of the antenna element 22, each of which is constituted by a substantially triangular conductive plate having a curved surface corresponding to a curved surface of a body end. Those antenna reflectors 23, 24 are covered by a mold 25 for covering the antenna 1 so that they are not viewed from exterior portion.

Figure 4:
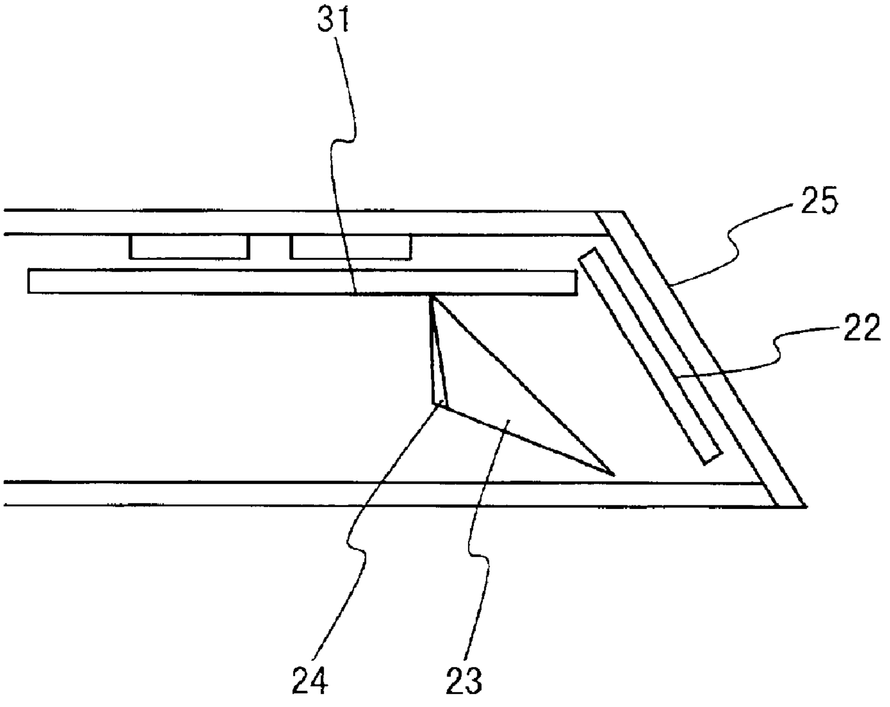
FIG. 4 is a side view showing an inside of the configuration of the lower portion of the portable telephone apparatus according to this embodiment.

FIG. 4 is an enlarged view showing an inside in a longitudinal direction of the lower portion in the portable telephone apparatus (when viewed from a lateral direction. A board 31, the antenna element 22 and the antenna reflectors 23, 24 are disposed on the body of the portable telephone apparatus. The board 31 is disposed on a keyboard side of the portable telephone apparatus, and a radio portion and the like are mounted on the board 31. The antenna element 22 is disposed within the body of the lower portion at which a microphone (receiver) of the portable telephone apparatus is located, and is electrically connected to a high frequency circuit of the board 31. The antenna reflectors 23, 24 are constituted by two conductive plates that are disposed in the inside (vicinity) of the antenna element 22 and insulated from each other, and their ends are disposed substantially parallel to the longitudinal direction of the antenna element 22, and the surfaces of the conductive plates are oriented to the directions different from each other. The upper portion of the antenna element 22 is covered by the mold 25. The antenna reflectors 23, 24 of FIG. 4 are located on a lower side of the antenna element 22, and connected to a later-described ground impedance circuit for varying an impedance, which is mounted on the board 31 of the radio portion.

Figure 5:
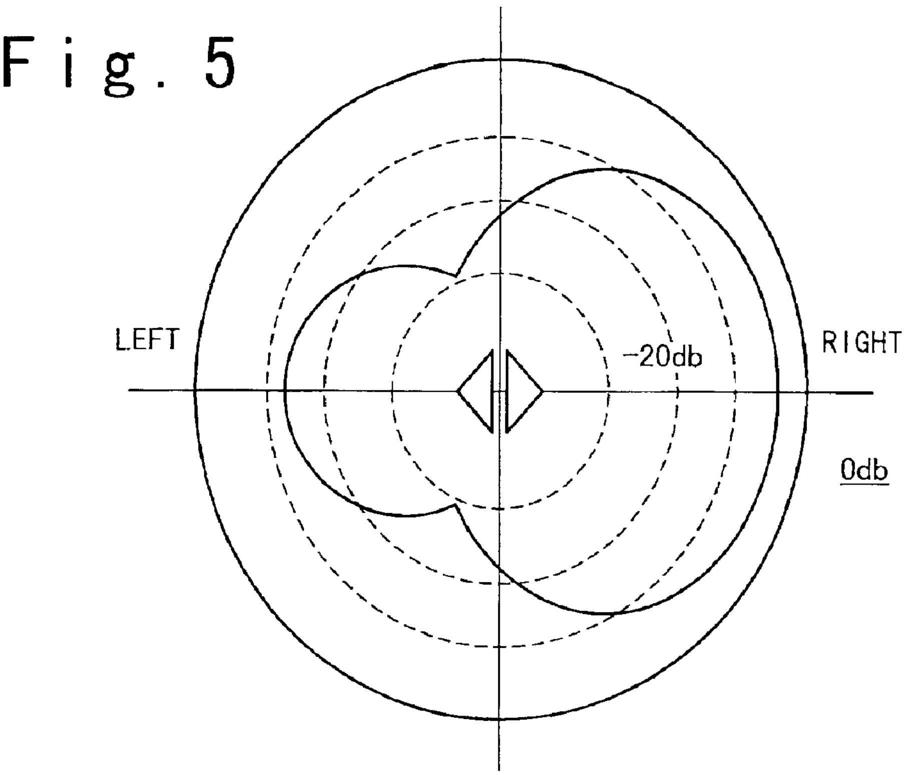
FIG. 5 is a property view in an operation for switching to one antenna reflector.
Figure 6:
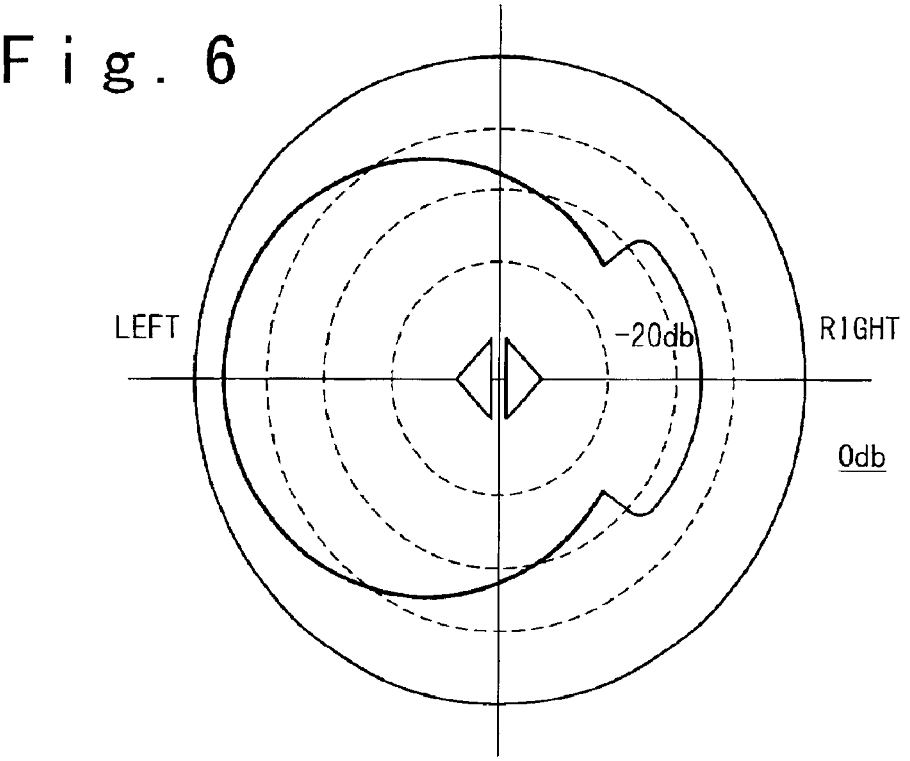
FIG. 6 is a property view in an operation for switching to the other antenna reflector.

FIGS. 5, 6 are property views showing the changes in the properties of the antennas after an execution of an operation for switching between the antenna reflectors 23, 24. The operation for switching between the antenna reflectors 23, 24 is done by connecting one of them to a ground. The directivity of an electric wave emitted from the antenna element 22 is switched by the antenna reflector 23 or 24 connected through an impedance to the ground. Accordingly, the diversity function is attained.

When the antenna reflector 24 is selected as a ground side after an execution of the operation for switching between the antenna reflectors 23, 24, the directivity of the antenna element 22 has a directivity oriented to a right side because of an interference to the antenna reflector 24. On the contrary, when the antenna reflector 23 is selected, the directivity of the antenna element 22 has a directivity oriented to a left side because of an interference to the antenna reflector 23.

Figure 7:
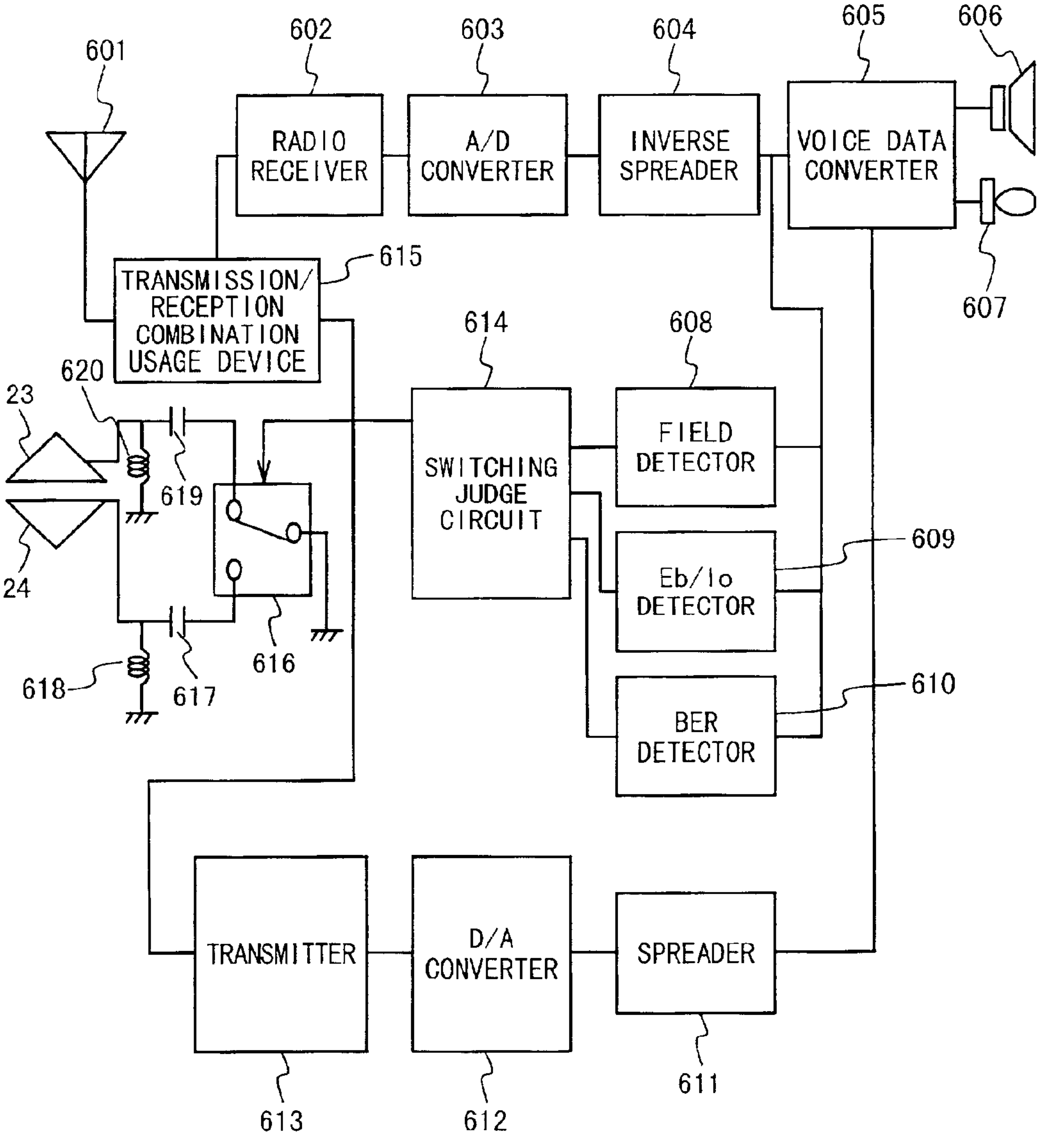
FIG. 7 is a view showing a circuit block in this embodiment.

FIG. 7 is a view showing a circuit block of a portable telephone apparatus in a W-CDMA system suitable for this embodiment. In a case of the W-CDMA system, a transmission/reception combination usage device 615 is used for the continuous reception and the continuous transmission. The reception side has a radio receiver 602, an A/D converter 603 and an inverse spreader 604. The transmission side has a voice data converter 605, a spreader 611, a D/A converter 612 and a transmitter 613, and further has a voice data converter 605, a speaker 606 and a microphone 607.

Also, as the antenna, it has the antenna element 22 and the antenna reflectors 23, 24. Each of the antenna reflectors 23, 24 is connected to the GND (a ground conductor) of the board 31 through each of the coils 618, 620 which constitutes the ground impedance circuit. In the antenna reflectors 23, 24, one of the antenna reflectors 23, 24 is connected to the GND of the board 31 by the switching relay 616 through one of the capacitors 617, 619 to vary the impedance.

A control circuit is provided with a field detector 608, an Eb/Io detector 609, a BER detector 610 and a switching judge circuit 614 for controlling the switching relay 616 in accordance with the detected output.

The directivity of the antenna element 22 on the lower portion of the portable telephone apparatus is changed by switching the action of the switching relay 616 and thereby changing the ground impedance and also switching between the antenna reflectors 23, 24. The change in the directivity of the antenna element 22 leads to a directivity deviated to a right side when the antenna reflector 24 is selected as the ground side, and leads to an opposite directivity deviated to a left side when the antenna reflector 23 is selected as the ground side. This change in the directivity results from the change in the directivities of the right and left antennas because of the change in the ground impedance of the GND existing on the lower portion of the antenna element 22, and it does not result from the fact that the electric wave is reflected by the mechanic structure of the antenna reflectors 23, 24.

(Explanation of Operation)

The operation in this embodiment will be described below in detail with reference to the drawings. At first, the transmission/reception operation is described with reference to FIG. 7.

In the reception operation, a reception signal is inputted through the combination usage device 615 to the receiver 602, and converted into a digital signal by the A/D converter, and demodulated by the inverse spreader 604 that is the feature of the W-CDMA system, and then outputted from the speaker 606 as a voice by the voice data converter 605.

In the transmission operation, the voice from the microphone 607 is digitized by the voice data converter 605. Then, the spreader 611 performs a W-CDMA code diffusion on the digitized voice. After that, the D/A converter 612 performs the D/A conversion on it. Then, the transmitter 613 transmits it through the combination usage device 615 from the antenna 601.

In this transmission/reception apparatus, in order to attain the antenna diversity operation to improve the transmission/reception property, the field detector 608 receives a reception field strength from an output data of the inverse spreader 604 in the receiver. At the same time, the Eb/Io detector 609 detects a reception Eb/Io value. The BER detector 610 measures a BER (Bit Error Rate) of the reception field.

The detected and measured values are inputted to the switching judge circuit 614 for controlling so as to switch between the antenna reflectors 23, 24 of the antenna. It judges the deterioration in the reception state, in accordance with the signals from the field detector 608, the Eb/Io detector 609 and the BER detector 610, and then switches the action of the switching relay 616.

This operation enables the portable receiver in this embodiment to change the directivity of the antenna and select the optimal reception state, in the case of the occurrence of the deterioration in the reception field strength, the deterioration in the reception Eb/Io value, or the deterioration in the BER of the reception field.

The control operation will be described below for switching the action of the switching relay 616 in accordance with the signal from the switching judge circuit 614, and then switching between the antenna reflectors 23, 24, and accordingly changing the antenna directivity of the portable telephone apparatus.

Figure 8:
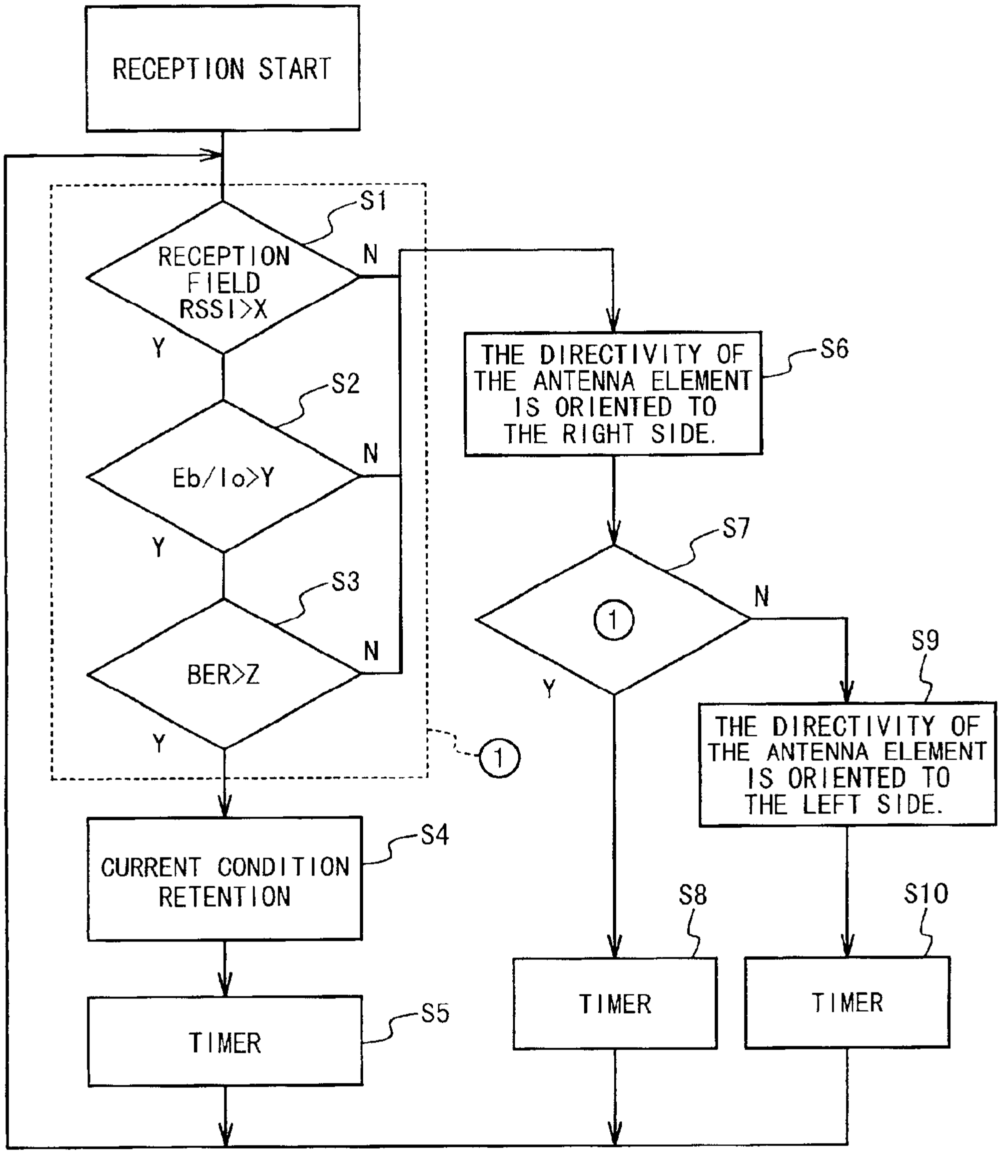
FIG. 8 is a view showing an operation for switching between antenna reflectors.

FIG. 8 is a process flow chart showing the switching control operation between the antenna reflectors 23, 24 in this embodiment.

When a power supply of the portable telephone apparatus is turned on to then start a reception operation, a reception field RSSI (Received Signal Strength Indicator), an Eb/Io value and an error rate BER are measured. Then, they are compared with respective standard judgment values X, Y and Z, in the (1) judging process. The comparison judgments as to whether or not the reception field RSSI is greater than the standard judgment value X (s1), whether or not the Eb/Io value is greater than the standard judgment value Y (s2) and whether or not the error rate BER is greater than the standard judgment value Y (s3) are sequentially carried out.

If the respective measured values are equal to or greater than the respective corresponding standard judgment values (X, Y and Z), it is judged that the reception state is allowable, and a current condition retention, namely, a current condition preservation for carrying out the transmission/reception operation without switching between the antenna reflectors is done (s4). However, the reception state is always changed even in the case of the current condition preservation. Thus, after the current condition retention, if it becomes equal to or greater than a certain timer value (s5), the (1) judging operation is again carried out.

If any one of the reception field RSSI, the Eb/Io value and the error rate BER is equal to or less than the corresponding standard judging value (N of s1, s2 or s3), the directivity of the antenna element is once oriented to the right side (s6), and the (1) judging process is carried out (s7). If it becomes at the allowable reception state at this time, the retention operation is carried out for a certain time set by a timer (s8). After an elapse of the certain time, the (1) judging process is again carried out.

If it is judged in the (1) judgment at the step s7 that the reception state is not allowable (N of s7), the directivity is changed to the left side (s9). Then, the retention operation is carried out for the certain time set by the timer (s10). After the elapse of the certain time, the (1) judging process is again done.

In accordance with the above-mentioned operations, the switching operation between the antenna reflectors 23, 24 to be connected to the ground is done so as to obtain the antenna directivity under which the reception state is always optimal.

Figure 9:
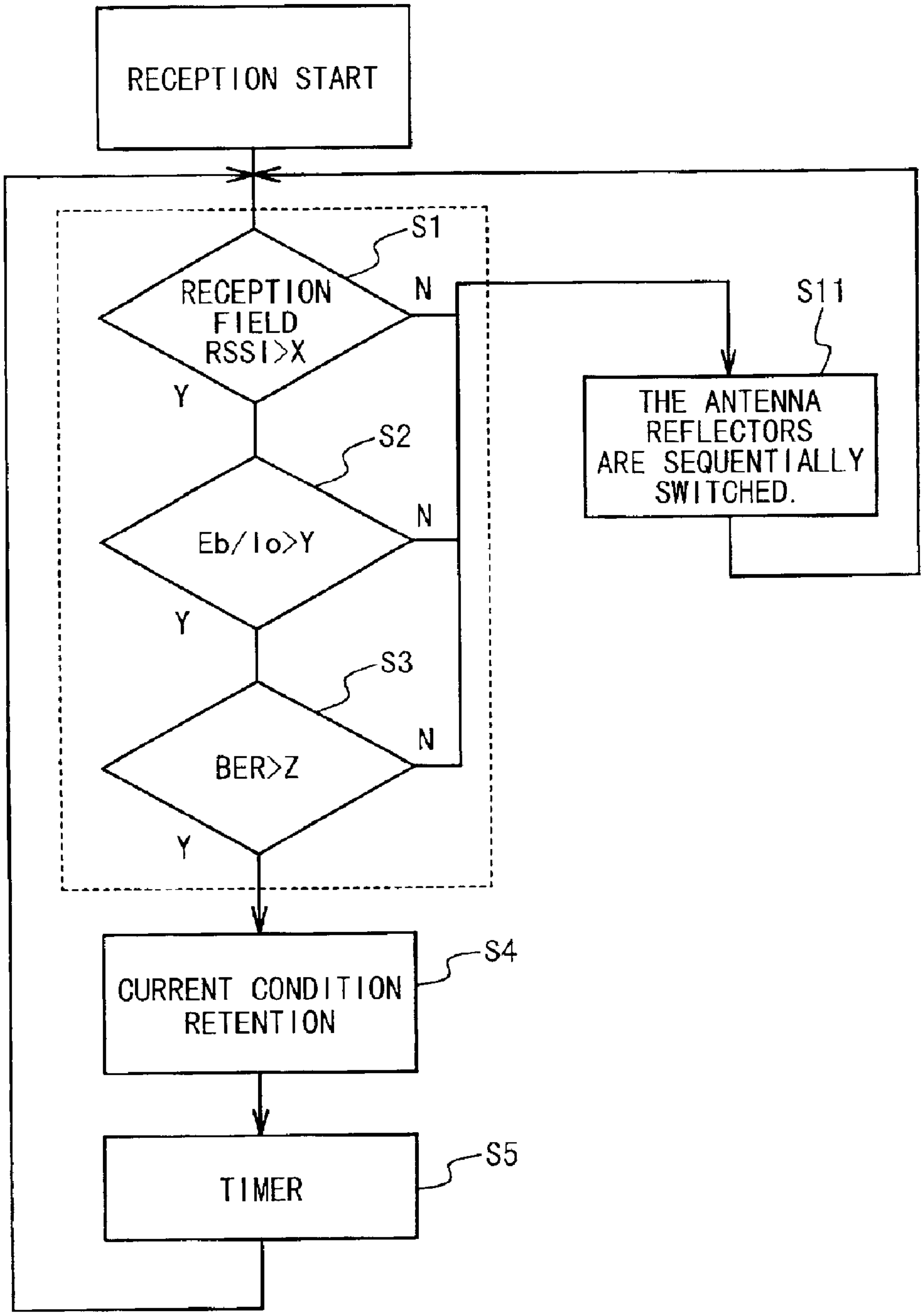
FIG. 9 is a view showing an operation for switching between a plurality of antenna reflectors.

In the above-mentioned embodiment, the case is described in which the two conductive plates are used as the antenna reflector. However, it can be configured by using the three or more conductive plates. A process flow chart of a control for switching the antenna reflector in this case can be designed as shown in FIG. 9. If a fact that a predetermined reception state can not be obtained is detected at the judgments (s1 to s3) with regard to the reception state, the antenna reflectors are sequentially switched by reducing a ground impedance of another antenna element at a step s11.

According to the present invention, since the antenna is disposed on the lower side on which the microphone of the portable telephone apparatus is disposed, a distance between the antenna and the human body is made longer. Thus, it is unlikely to suffer from the influence of the human body. Hence, it is possible to effectively receive the received electric wave. Moreover, it is possible to reduce the influence caused by the emission power of the antenna on the human body.

Also, the ground impedance of the antenna reflector can be controlled on the basis of the reception state. Thus, the antenna directivity can be made optimal. Hence, even in the case of the mixture of a direct wave of an electric wave from a base station and a reflection wave reflected from a building, a mountain and the like, the antenna directivity can be changed so as to receive the optimal reception wave.

Moreover, in the system of the continuous transmission and the continuous reception, such as the W-CDMA, it is difficult to use the antenna diversity method. However, according to the present invention, the noise caused by the operation for switching between the antennas is never induced. Thus, it is possible to attain the antenna diversity effect.

What is claimed is:

1. A portable telephone apparatus, comprising:

a body;

an antenna section; and a switching unit to switch between one and another of said plurality of reflectors, wherein said antenna section includes an antenna element and a plurality of reflectors provided near said antenna element, wherein said antenna section is provided at an end side where a microphone is provided in said body, wherein one of said plurality of reflectors is connected to a ground, selectively to change the direction of said antenna element, and wherein each of said plurality of reflectors is connected to said ground through a capacitor.

2. The portable telephone apparatus according to claim 1, wherein said antenna section is provided in said body.

3. The portable telephone apparatus according to claim 1, wherein the number of said plurality of reflectors is two.

4. The portable telephone apparatus according to claim 1, wherein each of said plurality of reflectors is a conductive plate.

5. The portable telephone apparatus according to claim 1, wherein an end portion of each of said plurality of reflectors is in parallel with a direction of a length of said antenna element.

6. The portable telephone apparatus according to claim 1, wherein planes of said plurality of reflectors are oriented to directions different from each other.

7. The portable telephone apparatus according to claim 1, wherein one of said plurality of reflectors is connected to a ground, selectively to change the direction of said antenna element.

8. The portable telephone apparatus according to claim 7, wherein said direction of said antenna element is changed without using a mechanic structure to reflect radio waves emitted from said antenna element of said plurality of reflectors.

9. The portable telephone apparatus according to claim 7, wherein one of said plurality of reflectors is connected to said ground, selectively to change a direction of said antenna element at established periods.

10. The portable telephone apparatus according to claim 1, further comprising:

a judging unit judging a state of a signal received at said antenna section to produce a control signal, wherein one of said plurality of reflectors is connected to a ground, selectively to change the direction of said antenna element, based on said control signal.

11. The portable telephone apparatus according to claim 10, wherein after said one of said plurality of reflectors is connected to said ground, selectively to change said directivity of said antenna element, based on said control signal, said another of said plurality of reflectors is connected to said ground, selectively to change the direction of said antenna element, based on said control signal.

12. The portable telephone apparatus according to claim 10, wherein said judging unit detects an RSSI, an Eb/Io, and a BER of said received signal to produce said control signal.

13. The portable telephone apparatus according to claim 1, wherein said antenna section is covered by a mold such that said antenna section cannot be viewed.

14. The portable telephone apparatus according to claim 1, wherein a coil is provided between said each reflector and said capacitor to be connected with said ground.

15. The portable telephone apparatus according to claim 1, wherein said portable telephone apparatus is a type of W-CDMA system.

16. The portable telephone apparatus according to claim 15, wherein said portable telephone apparatus performs a continuous transmission and a continuous reception.

17. The portable telephone apparatus according to claim 1, wherein said plurality of reflectors is provided under a board on which a radio unit is mounted.

18. The portable telephone apparatus according to claim 1, wherein each of said plurality of reflectors has a triangular shape.

19. The portable telephone apparatus according to claim 1, wherein each of said plurality of reflectors has a curved surface corresponding to a curved surface of an end portion of said body.

* * * * *